United States Patent [19] [11] 3,921,469
Richards [45] Nov. 25, 1975

[54] TRANSMISSION WITH RESILIENTLY LOADED MAIN SHAFT GEARS

[75] Inventor: Elmer A. Richards, Kalamazoo, Mich.

[73] Assignee: Eaton Corporation, Cleveland, Ohio

[22] Filed: Mar. 20, 1974

[21] Appl. No.: 452,825

Related U.S. Application Data

[62] Division of Ser. No. 276,376, July 31, 1972, Pat. No. 3,799,002.

[52] U.S. Cl. .............. 74/339; 192/53 F; 192/48.91
[51] Int. Cl.². F16H 3/38; F16D 13/00; F16D 21/02
[58] Field of Search ......... 74/339, 352; 192/48.91, 192/53 F, 53 E

[56] References Cited
UNITED STATES PATENTS

| | | | |
|---|---|---|---|
| 2,267,452 | 12/1941 | Fishburn | 192/53 F |
| 2,369,369 | 2/1945 | Peterson et al. | 192/53 F X |
| 2,607,458 | 8/1952 | Orr | 74/339 X |
| 2,892,524 | 6/1959 | Sinclair | 74/339 X |
| 3,175,413 | 3/1965 | Peras | 74/339 |
| 3,745,847 | 7/1973 | Worner et al. | 74/339 |

FOREIGN PATENTS OR APPLICATIONS

| | | | |
|---|---|---|---|
| 71,898 | 8/1959 | France | 74/339 |
| 1,147,813 | 4/1963 | Germany | 74/339 |

*Primary Examiner*—Samuel Scott
*Assistant Examiner*—P. S. Lall
*Attorney, Agent, or Firm*—Teagno & Toddy

[57] ABSTRACT

A shiftable change speed gear system, particularly a transmission, having resilient shifting mechanisms for simplifying the transmission structure and the shifting thereof. The transmission is preferably provided with multiple countershafts having countershaft gears thereon disposed in meshing engagement with main shaft gears encircling the transmission main shaft, said main shaft gears being supported on and solely by the countershaft gears. The main shaft gears are axially movable relative to the main shaft by conventional means for effecting shifting of the transmission. The main shaft gears cooperate with clutch rings which surround and are supported on and for rotation with the main shaft, the clutch rings also being axially movable relative to the main shaft and being resiliently urgeable in a direction toward the respective main shaft gear with which same cooperates, whereby shifting of the main shaft gear toward its respective clutch ring causes resilient axial movement of the latter until synchronization is achieved to permit the clutch ring to move axially in response to said resilient urging and engage the main shaft gear. The transmission, in one modification thereof, is provided with a range section which also incorporates a shiftable main shaft gear therein, the main shaft of the transmission comprising a single shaft which extends continuously through both the main transmission section and the range section.

6 Claims, 9 Drawing Figures

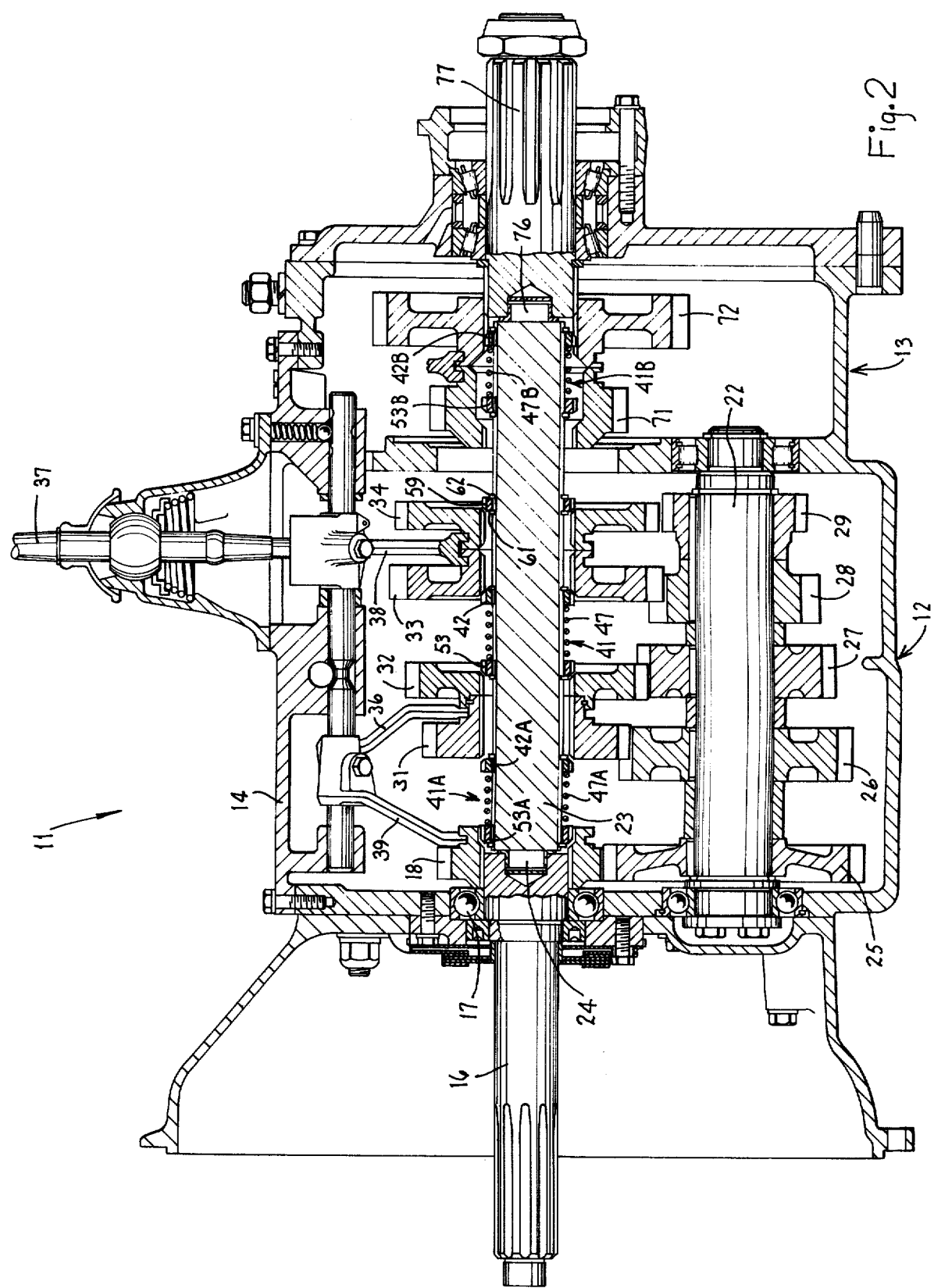

TRANSMISSION WITH RESILIENTLY LOADED MAIN SHAFT GEARS

This is a division of application Ser. No. 276,376, filed July 31, 1972 now U.S. Pat. No. 3,799,002.

FIELD OF THE INVENTION

This invention relates to a shiftable change speed gear device and particularly relates to a transmission, preferably a multiple countershaft transmission, having resiliently yieldable shifting mechanisms for substantially simplifying shifting of the transmission.

BACKGROUND OF THE INVENTION

In the design of transmissions, particularly heavy duty transmissions such as used on trucks, there has existed for a long time the problem of shifting the transmission through the various speed ratios, which problem is even greater when the transmission is provided with an auxiliary or range transmission section for increasing the number of speed ratios. In most known transmissions, the shifting process is either relatively difficult and/or the shifting mechanism is relatively complex. Thus, there has been a continuing effort in the design of transmissions to improve the shifting, to improve the rapidity of shifting, to reduce the complexity of the shifting mechanism and to reduce its cost. Hence, without detracting from the operability or desirability of many of the shifting mechanisms previously known, it may be stated that in the present invention these general objectives are accomplished to even a greater degree than has been previously known.

Particularly, most known transmissions have necessarily utilized synchronizers, of which many different types are known, for causing the speed of the jaw or toothed clutch members to be substantially synchronized prior to permitting their interengagement during a shifting sequence from one speed ratio to another speed ratio. While the use of synchronizers does permit the shifting operation to be performed, nevertheless the use of synchronizers is, in many instances, undesirable since not only do synchronizers increase the mechanical complexity of the transmission, but they also occupy additional space so that the transmission is necessarily larger and heavier and is likewise of increased cost. The synchronizers also undergo substantial wear and thus require periodic maintenance. Accordingly, there has long existed a need for a successful heavy duty transmission which can be successfully operated for long periods of time without requiring the use of conventional synchronizers and yet one which will permit successful and simple shifting thereof.

A further disadvantage of many known transmissions, including those utilizing conventional synchronizers, is the large amount of effort or force which must be exerted by the vehicle driver in order to succesfully shift from one speed ratio to another. The shifting operation in such known transmissions generally requires that the operator apply a force through a shifting linkage so as to move one jaw clutch member axially into meshing engagement with another jaw clutch member. Further, the force which must be exerted by the driver to perform the shifting is often of a substantial magnitude. The necessity of exerting such effort to permit the shifting operation to be performed is obviously undesirable since under conditions of frequent shifting, such as heavy traffic or mountain driving, it may be extremely tiring for the driver.

Still another disadvantage of the shifting mechanisms of known transmissions is the length of time required for the shifting operation to be performed. Most known transmissions, due to the necessity of having synchronizers and other related structure, have necessarily provided a substantial amount of mass on the main transmission shaft. Such mass considerably increases the inertia of the transmission main shaft so that a synchronized speed condition can be rapidly achieved only by the use of large synchronizers. This results in still further size and expense.

Further, in transmissions provided with a range or auxiliary section, the above problems are even more difficult and complex. Particularly when the auxiliary transmission is set to produce a first range of speeds, the speed of the engine must be altered to a predetermined extent to shift the main transmission section from one ratio to the next. However, when the auxiliary transmission is set to produce a second range of speeds, the engine speed must be altered a different amount in order to shift the gears in the main transmission. Thus, when it is necessary to make both a range and a main transmission shift, driving of the vehicle with many of the known transmissions has been difficult since it has required either a complex control mechanism or a conscious and physical effort by the driver to shift through the two ranges of speed.

Accordingly, it is an object of the present invention to provide a transmission having an improved shifting structure for overcoming the above-mentioned disadvantages. Particularly, it is an object of the present invention to provide:

1. A transmission having means to improve the ease of shifting, to improve the rapidity of shifting without requiring large synchronizers, to reduce the complexity of the mechanism and to reduce its cost.

2. A transmission, as aforesaid, having a shifting mechanism which does not require the use of conventional synchronizers.

3. A transmission, as aforesaid, which utilizes resilient means for causing meshing engagement of the jaw clutch members after the desired speed synchronization has been achieved.

4. A transmission, as aforesaid, having a main shaft assembly possessing a minimum of inertia whereby to eliminate the need for synchronizers.

5. A transmission, as aforesaid, having the main shaft gears floatingly supported relative to the main shaft by a plurality of countershaft gears so as to minimize the inertia of the main shaft, and including clutch collars keyed to the main shaft for cooperation with the main shaft gears.

6. A transmission, as aforesaid, wherein the clutch collars are resiliently axially urged toward the respective main shaft gears, with the main shaft gears being axially shiftable for meshing engagement with their respective clutch collars, each gear and associated clutch collar being provided with conical cooperating faces disposed for engagement with one another prior to synchronization of the members whereupon the resilient means causes the clutch collar to meshingly engage the main shaft gear when the desired synchronization is achieved.

7. A transmission, as aforesaid, particularly having both a main transmission section and a range or auxiliary transmission section for increasing the number of speed ratios and including a single and continuous main shaft extending through both the main and range sections for minimizing the inertia and simplifying the ease and rapidity of shifting.

8. A transmission, as aforesaid, which permits shifting to occur without requiring depression of the clutch pedal and disconnection of the drive clutch, and which permits a vehicle, such as a truck, to be easily driven and shifted even by an inexperienced driver.

Other objects and purposes of the invention will be apparent to persons acquainted with devices of this type upon reading the following specification and inspecting the accompanying drawings.

BRIEF DESCRIPTION OF THE DRAWINGS

FIG. 2 is a cross-sectional view of a transmission as taken substantially along the line II—II of FIG. 5.

Figure 1:
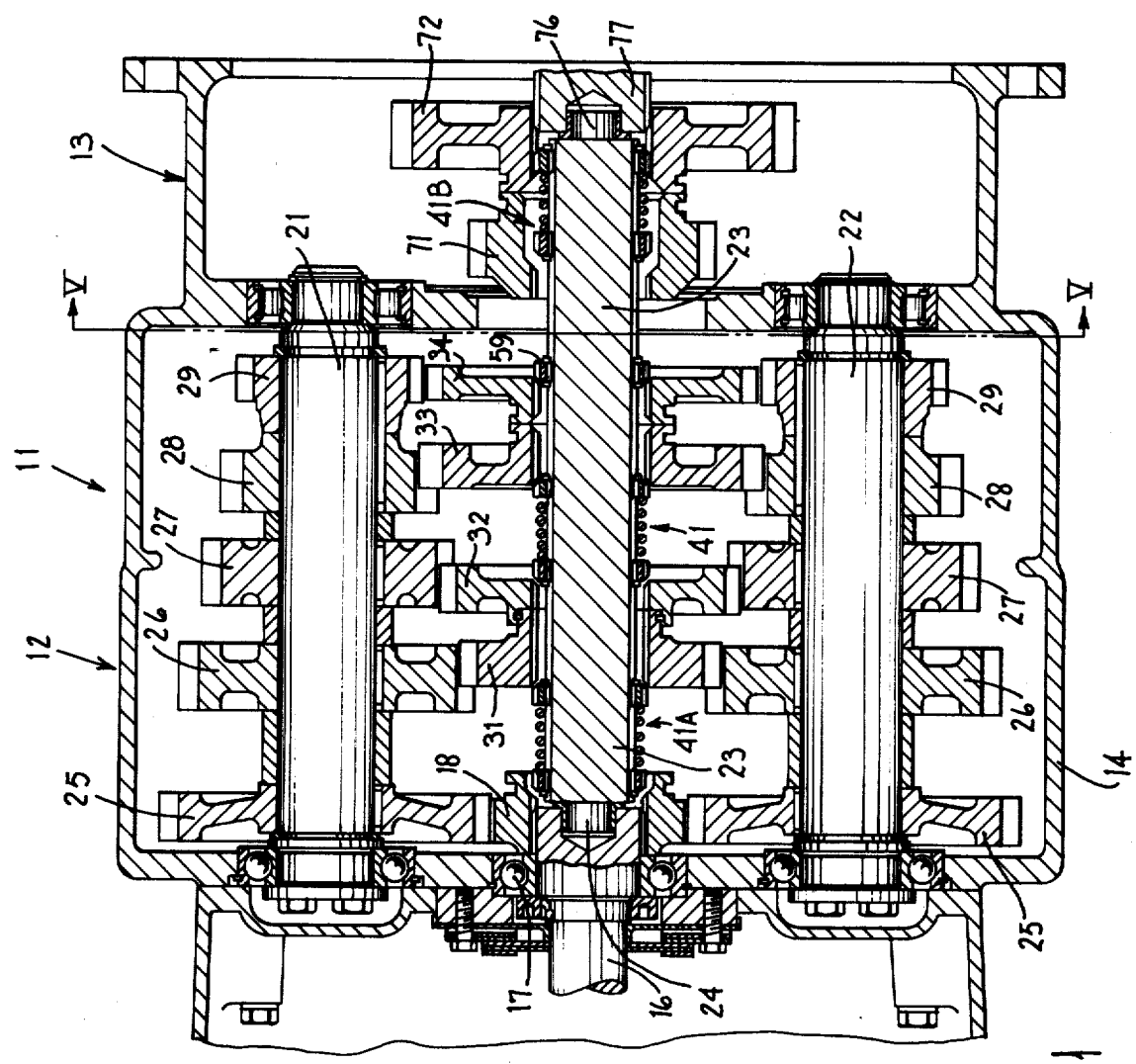
FIG. 1 is a cross-sectional view of a transmission constructed according to the present invention, as taken substantially along the line I—I of FIG. 5.

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer respectively to the front and rear ends of the transmission as same is conventionally mounted in the vehicle, being respectively the left and right sides of the transmission as illustrated in FIGS. 1 and 2. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the present invention are met by providing a transmission having yieldable shifting mechanisms together with cooperating arrangements which not only improve the ease and rapidity of shifting, but also substantially simplify the transmission structure and decrease the rotational inertia. The transmission preferably includes a plurality of countershafts each having an identical set of countershaft gears thereon. Main shaft gears encircle the transmission main shaft and are supported on and by the countershaft gears and in continuous meshing engagement therewith. By virtue of such mounting, the main shaft gears are floatable with respect to the axis of the main shaft. The yieldable shifting mechanism preferably includes a movable jaw clutch member resiliently urged toward engaged position for resiliently causing engagement to occur after the desired synchronized speed condition has been achieved. According to a preferred embodiment of the invention, the shifting mechanism includes a shifting linkage interconnected to the main shaft gears for causing axial shifting thereof relative to the main shaft, which main shaft gears are disposed for meshing engagement with annular shift collars nonrotatably disposed on the main shaft, the shift collars being axially movable relative to the main shaft and resiliently urged against a stop by resilient means, such as springs. The meeting faces of the main shaft gear and the clutch collar are provided with cooperating conical surfaces whereby axial shifting of the main shaft gear against the shift collar causes same to be axially displaced so as to compress the spring until the desired speed synchornization is achieved, whereupon the spring causes the collar to move axially so as to meshingly engage the main shaft gear.

In a further preferred modification of the improved transmission constructed according to the present invention, the transmission is provided with both a main transmission section and a range or auxiliary transmission section, both of which are provided with improved yieldable shifting mechanisms therein constructed according to the present invention. Further, the transmission is preferably provided with a single and continuous main shaft extending through both the main and range sections with all of the main shaft gears in both the range and main sections being rotatably and concentrically disposed about the main shaft, whereby the rotational inertia of the main shaft is substantially minimized to facilitate shifting of the transmission, particularly when shifting both the range and main sections.

DETAILED DESCRIPTION

Referring to the drawings, there is illustrated a transmission 11 having both a main transmission section 12 and a range or auxiliary transmission section 13, each of which has a plurality of selectable ratios. The main and range sections are both suitably enclosed by a conventional housing 14.

The transmission 11 specifically includes an input shaft 16 supported adjacent its rearward end by a bearing 17 and provided with an input gear 18 nonrotatably connected thereto, as by splines. The input gear 18 simultaneously drives a plurality of countershafts at equal speeds. In the illustrated embodiment, the transmission is provided with two countershafts 21 and 22 disposed on diametrically opposite sides of the main shaft 23, which main shaft is coaxially aligned with the input shaft 16 and is provided with a pilot portion 24 on its forward end rotatably received within and supported by the rearward end of the input shaft 16.

Each of the countershafts 21 and 22 is provided with an identical grouping of countershaft gears 25, 26, 27, 28 and 29 thereon, which groupings form pairs of gears, such as the pair of gears 26, of identical size and number of teeth and disposed on diametrically opposite sides of the main shaft 23.

A plurality of main shaft drive gears 31, 32, 33 and 34 encircle the main shaft and are selectively clutchable thereto one at a time by yieldable clutch mechanisms, as described in greater detail hereinafter.

The main shaft gears 31, 32 and 33 encircle the main shaft 23, are in continuous meshing engagement with, and are floatingly supported by, the diametrically opposed pairs of countershaft gears 26, 27 and 28, respectively, which mounting means and the special advantages resulting therefrom are explained in greater detail in U.S. Pat. Nos. 3,105,395, and 3,335,616. The main shaft gear 34 is the reverse gear and is in continuous meshing engagement with the pair of countershaft gears 29 by means of conventional intermediate gears (not shown). The forwardmost countershaft gears 25 are continually meshed with and driven by the input gear 18 for causing simultaneous rotation of the countershafts 21 and 22 whenever the input shaft 16 is rotatably driven.

As illustrated in FIG. 2, the main shaft gears 31 and 32 are axially interconnected to form a gear pair and are connected to a conventional shift fork 36, the position of the shift fork 36 being controlled in a conventional manner by means of a shift lever 37. The main shaft gear pair 31-32 is thus shiftable axially relative to the main shaft 23 in response to axial shifting of the fork 36 by the lever 37. However, the gears 31 and 32 are independently rotatable relative to one another. In a similar manner, the main shaft gears 33 and 34 are also axially interconnected so as to be axially shiftable as a pair by means of the shift fork 38, which shift fork is also controlled by means of the shift lever 37. The main shaft gear pair 33-34 is likewise axially movable relative to the main shaft 23.

The input gear 18 is also interconnected to a conventional shift fork 39, which shift fork is similarly controlled by the shift lever 37 for permitting input gear 18 to be shifted axially for selectively permitting direct driving engagement between the input shaft 16 and the main shaft 23.

Figure 3:
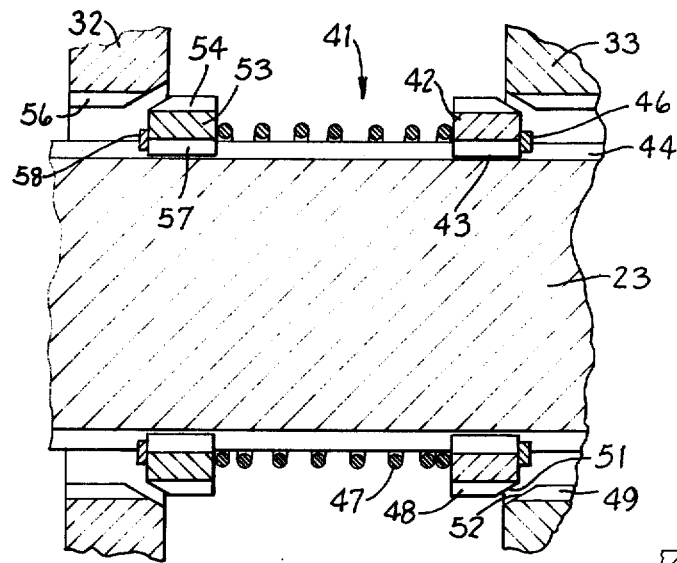
FIG. 3 is an enlarged, fragmentary view of the improved resilient clutch structure according to the present invention.

The yieldable clutch structure, as illustrated in detail in FIG. 3, is generally designated 41 and includes an annular clutch collar 42 encircling the main shaft 23. The clutch collar 42 is provided with internal splines 43 which are disposed within corresponding external splines 44 provided on the main shaft 23 for interconnecting the clutch collar 42 to the main shaft 23 for rotation therewith. However, the cooperating splines 43 and 44 permit the clutch collar 42 to freely slide axially relative to the shaft 23. A stop ring 46 is seated within a suitable groove formed on the external periphery of the shaft 23 and is disposed for contacting the clutch collar 42 and limiting the axial movement thereof. The collar 42 is normally resiliently urged by means of a spring 47 into abutting engagement with the stop ring 46.

The clutch collar 42 is provided with external teeth 48 thereon which are adapted to meshingly engage the internal teeth 49 provided on one of the main shaft gears, such as the gear 33. The teeth 48 on the clutch collar 42 are tapered, as at 51, and in a similar manner the leading edge of the teeth 49 on the main shaft gear 33 are similarly tapered as at 52. The confronting tapered conical surfaces 51 and 52 each extend at an angle of preferably between 30 and 40 degrees relative to the longitudinal axis of the main shaft 23. The exact degree of taper, and the advantages thereof, are explained in detail in U.S. Pat. No. 3,265,173. The other end of the spring 47 resiliently acts against a further clutch collar 53, which collar is identical to the collar 42 but is disposed so that it has the tapered leading ends of its teeth facing in the opposite direction. The clutch collar 53 has external teeth 54 which are adapted to meshingly engage the internal teeth 56 provided on the main shaft gear 32, the leading edges of the teeth 54 and 56 each being tapered in a manner similar to the tapered surfaces 51 and 52 as explained in detail above. The clutch collar 53 is also provided with internal splines 57 for nonrotatably but axially slidably engaging the main shaft 23. The clutch collar 53 is resiliently urged by the spring 47 into a position whereby it normally abuttingly contacts a further stop ring 58.

A further resilient clutch assembly 41A is disposed concentrically to the main shaft 23 and positioned between the main shaft gear 31 and the input gear 18. The yieldable clutch assembly 41A is identical to the clutch assembly 41 and is disposed for meshing engagement with the internal teeth of either of the main shaft gear 31 or the input gear 18.

The main shaft 23 is additionally provided with a further clutch collar 59 concentrically and nonrotatably mounted thereon, which clutch collar 59 is identical to the clutch collar 42 described above. However, the clutch collar 59 is axially confined relative to the main shaft 23 by stop rings 61 and 62 disposed on the opposite axial sides thereof. The clutch collar 59 is disposed for meshing engagement with the internal teeth of the main shaft gear 34 when said gear 34 is shifted rightwardly from the position illustrated in FIG. 2. The clutch collar 59 is not resiliently loaded or biased as is true of the clutch assemblies 41 or 41A since the clutch collar 59 is utilized only when the transmission is driving in reverse, and thus the resilient loading of the clutch collar is not necessary. However, a spring could obviously be provided for resiliently loading the clutch collar 59 if so desired.

Figure 5:
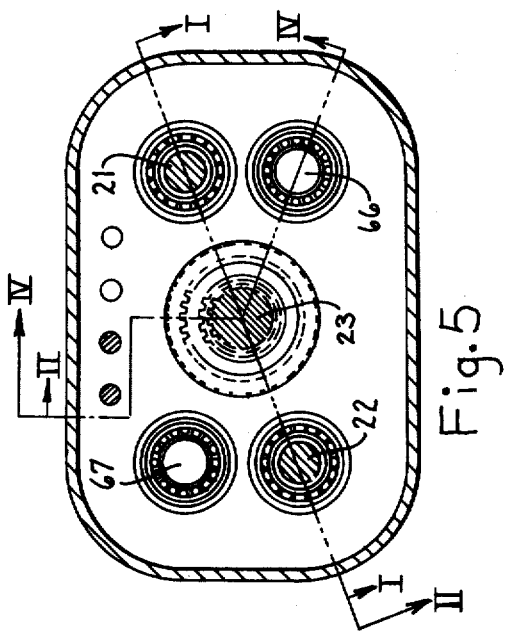
FIG. 5 is a sectional elevational view as taken along the line V—V of FIG. 1.
Figure 4:
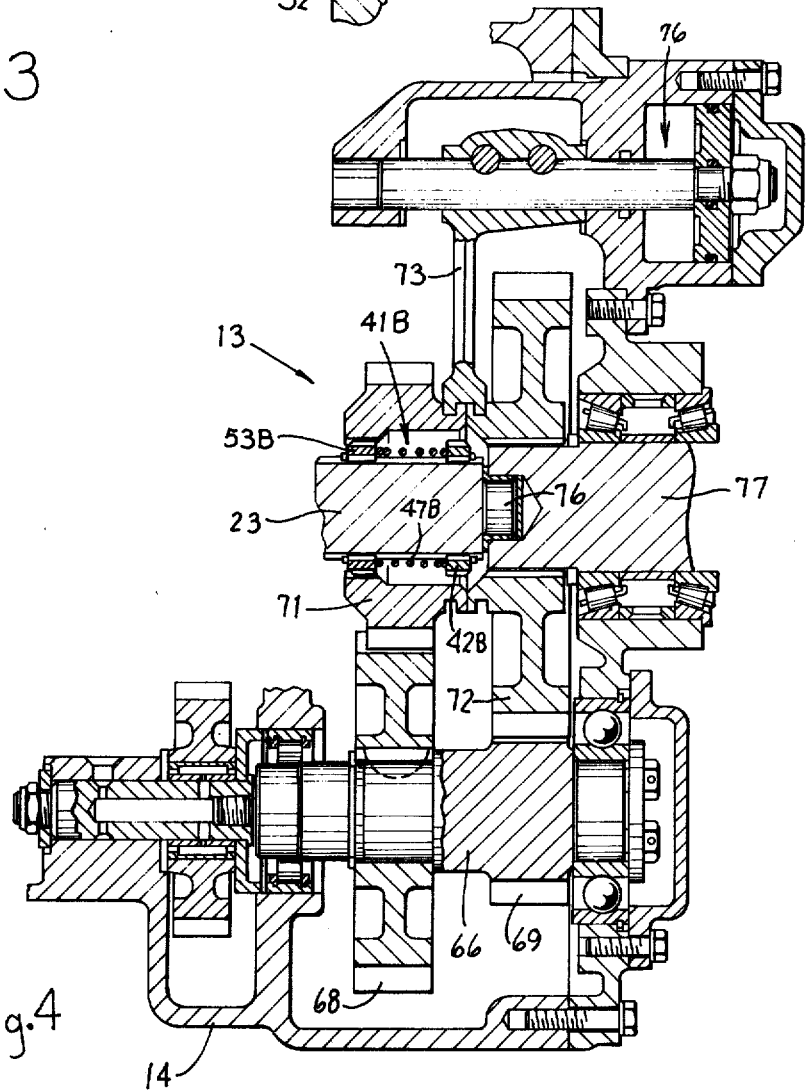
FIG. 4 is a sectional view as taken substantially along the line IV—IV of FIG. 5.

Considering now the range section 13, same includes a plurality of countershafts 66 and 67 (FIG. 5) each having an identical grouping of countershaft gears 68 and 69 (FIG. 4) thereon. The first pair of countershaft gears 68 are disposed diametrically opposite and in continuous meshing engagement with a main shaft gear 71, which main shaft gear is floatingly supported by the pair of countershaft gears 68 for substantially concentrically encircling the main shaft 23. A further main-shaft gear 72 is also floatingly and substantially concentrically supported relative to the main shaft 23 by the other pair of countershaft gears 69. The pair of main shaft gears 71 and 72 are axially interconnected and axially movable relative to the main shaft 23 by a further shift fork 73, which shift fork in connected to and movable by any automatically controllable power means, such as a piston structure 76. The piston structure 76 is shiftable in a conventional manner, such as by means of a manually actuated, preferably preselectable, range shift button or lever provided in the vehicle occupant compartment, which in turn controls a valve (not shown) for supplying pressure fluid to the piston structure.

As illustrated in FIG. 2, the main shaft 23 extends continuously through not only the main transmission section 12, but also through the range transmission section 13. The rearward end of the main shaft 23 is provided with a pilot portion 76 which is rotatably received and supported within the end of the output shaft 77.

The range section main shaft gears 71 and 72 are each individually clutchably engagable with the main shaft 23 by means of a resilient clutch assembly 41B, which assembly is identical to the assembly 41 described above. The assembly 41B includes clutch collars 42B and 53B splined on the main shaft 23 and resiliently urged axially in opposite directions by means of the intermediate spring 47B. The external teeth formed on the clutch collars 42B and 53B are adapted to respectively meshingly engage the internal teeth formed on the main shaft gears 72 and 71, respectively. The internal teeth on the main shaft gear 72 are also disposed in meshing engagement with corresponding external teeth formed on the output shaft 77 as illustrated in FIG. 2.

OPERATION

The operation of the transmission constructed according to the present invention will be briefly described to insure a more complete understanding thereof.

Assuming first that both the main section 12 and the range section 13 are to be in low gear, then the main shaft gear 33 will be clutchably engaged with the main shaft 23 by means of the intermediate clutch collar 42, and the pair of main shaft gears 71–72 will be shifted rearwardly (rightwardly in FIG. 2) so that main shaft gear 71 will be clutchably engaged to the main shaft 23 by means of the clutch collar 53B while the main shaft gear 72 will be disengaged from the clutch collar 42B. Thus, when in low gear, power will be transmitted from input shaft 16 to input gear 18 and through the pair of countershaft gears 25 so as to cause identical rotation of the countershafts 21 and 22. Rotation of the countershafts causes a corresponding rotation of the pair of countershaft gears 28, which in turn cause rotation of main shaft gear 33 which then drives main shaft 23. Main shaft 23 drives the main shaft gear 71 which transmits torque through the countershaft gears 68 and 69 to the further main shaft gear 72, which is drivingly connected directly to the output shaft 77 for causing rotation thereof.

After the vehicle has been put into motion and it is desired to shift into second gear, the driver will move the shift lever 37 so as to move the shift fork 38 and the gear pair 33-34 rearwardly (rightwardly in FIG. 2) to disengage the main shaft gear 33 from the clutch collar 42. The main transmission is now in neutral. The shifting movement of the shift lever 37 is continued to cause a rearward shifting (rightwardly in FIG. 2) of the shift fork 36 and the gear pair 31–32 whereupon the tapered face on the main shaft gear 32 will contact the tapered surface on the clutch collar 53. However, since the gear 32 will be rotating faster than the collar 53, the collar will not meshingly engage the gear 32 and thus the collar 53 will be moved axially (rightwardly in FIG. 2) in opposition to the spring 47. In order to synchronize the speeds of the gear 32 and the collar 53, the vehicle operator will release the vehicle throttle or accelerator (supplemented if desired for still faster operation by a conventional countershaft brake) so as to decrease the speed of the input shaft 16, whereupon the gear 32 will slow down to approach the speed of the collar 53. When the desired synchronization between the two members is achieved, the spring 47 will cause the collar 53 to move forwardly (leftwardly in FIG. 2) so as to automatically meshingly engage the gear 32 and thereby drivingly couple gear 32 to the main shaft 23.

When it is desired to shift into the third speed ratio, the shift fork 36 and the gear pair 31–32 will be moved leftwardly so as to cause gear 32 first to disengage collar 53 and then to cause gear 31 to contact the clutch collar 42A. Since the gear 31 is rotating faster than the collar 42A, the collar 42A will be moved axially leftwardly against the urging of the spring 47A until the engine speed has decreased sufficiently to provide a substantially synchronized speed condition, whereupon the spring will then cause the collar 42A to move axially rightwardly so as to meshingly engage the gear 31.

In a similar manner, when it is desired to shift into fourth gear, shift fork 36 will first be moved rightwardly to disengage gear 31 from clutch collar 42A and then shift fork 39 will be moved rightwardly to cause the input gear 18 to contact the clutch collar 53A, which collar will be axially moved in opposition to the resilient urging of spring 47A until a synchronized speed condition is achieved, whereupon the collar 53A will be moved axially leftwardly to engage the input gear 18 to provide for a direct driving connection between the input shaft 16 and the main shaft 23.

In order to shift into the fifth speed ratio, it is necessary to perform not only a shifting in the main transmission section, but it is also necessary to perform a shifting within the range section. Thus, to shift to the fifth speed ratio, both the range shift control (not shown) and the shift lever 37 are actuated. Preferably, as in the U.S. Patent to Ludvigsen and Backus No. 3,637,221, the range shift is preselected and then caused to operate automatically upon the shift lever entering its neutral position. Thus, after appropriate preselection of the range shift control as set forth in said patent, the shift lever 37 is actuated to move the shift fork 39 forwardly, thereby disengaging gear 18 from clutch collar 53A and the main transmission is again in neutral. The range control, being now actuated, causes the piston 76 to be moved forwardly (leftwardly) from the position illustrated in FIG. 4, whereupon the gear 71 disengages the clutch collar 53B and the gear 72 contacts the clutch collar 42B and causes same to move axially leftwardly in opposition to the resilient urging of the spring 47B. In this condition, the main shaft 23 is disconnected from the output shaft 77 and, since the shaft 23 has no large structures mounted thereon, it possesses little inertia so that the shaft 23 will rapidly slow down to achieve a speed synchronization with the output shaft 77. When this occurs, the spring 47B will cause the clutch collar 42B to move axially rightwardly to meshingly engage the main shaft gear 72 so as to drivingly connect the main shaft 23 directly to the output shaft 77, as illustrated in FIG. 2.

Continuing movement of the shift lever 37 toward its fifth speed ratio position causes the gear 33 again to move axially leftwardly (low ratio position) so as to contact the clutch collar 42, which clutch collar will again be axially displaced and, when speed synchronization is achieved, will be axially moved rightwardly by the spring 47 so as to meshingly engage with the gear 33.

The sequence in shifting from the fifth to eighth speed ratio is identical to the sequence involved in shifting from the first to fourth speed ration as described in detail above.

Down shifting is carried out in the reverse manner to that described above. During a down shift, such as from the sixth to the fifth speed ratio (or from the second to the first speed ratio), gear 32 will be shifted leftwardly to disengage the clutch collar 53, and gear 33 will also be shifted leftwardly to contact the clutch collar 42, which clutch collar will be moved axially leftwardly in opposition to the spring 47 due to the difference in speed between the gear 33 and the clutch collar 42, the gear 33 being rotated at a slower speed than the clutch collar during down shifting. Accordingly, after gear 32 has disengaged the clutch collar 53, the driver of the vehicle will slightly depress the vehicle throttle or accelerator so as to increase the engine speed sufficiently to increase the speed of gear 33 to synchronize it with the speed of the clutch collar 42. When this is accomplished, the spring 47 will automatically urge the clutch collar 42 axially (rightwardly in FIG. 2) into meshing engagement with the internal teeth of the gear 33, thereby completing the down shift.

Other downshifts are similar and will be apparent from the foregoing. The resilient clutch structure of the present invention, as particularly illustrated in detail in FIG. 3, is highly desirable since in association with the other transmission components it results in minimizing the mass mounted on and rotatable with the main shaft, thereby minimizing the inertia of the main shaft. Further, the illustrated resilient clutch structure requires only a small space, thereby permitting the overall transmission length to be minimized. Further, since the shiftable main shaft gears are floatingly mounted by the adjacent countershaft gears and are not directly connected to the main shaft, the main shaft gears exert no frictional drag on the main shaft, either during shifting or when positioned in the idle condition.

A further advantage of the yieldable clutch structure illustrated in FIG. 3 is that it develops an engagement force which is independent of the force imposed on the shift lever 37. Further, the engagement force, as determined by the strength of the spring 47, can be individually designed for each speed ratio so as to provide for a minimum engagement force, thereby likewise minimizing wear. For example, at the low speed ratios, the shiftable sleeve collar may require either a larger mass or a lesser engagement force in order to control the engagement thereof with its respective main shaft gear at the desired synchronized speed. On the other hand, at the higher speed ratios, the engagement force can be increased or the mass of the shift collar can be reduced while still permitting control over engagement of the collar with its respective main shaft gear at the desired synchronized speed. The yieldable clutch structure according to the present invention is thus well suited for this type of operation since the mass of the individual shiftable clutch collars 42 and 53 and the engagement force developed within a spring 47 can be individually designed so as to provide a minimum engagement force depending upon whatever main shaft gear cooperates with the shiftable clutch collar. This optimum and independent design of each shiftable clutch assembly obviously results in minimizing the time required to effect a shift.

In the embodiment illustrated the clutch collars are all of the same size and such in an effective arrangement. However, in some instances there will be advantages in providing clutch units wherein one clutch thereof has a larger diameter than another clutch thereof. This permits a close accommodation of each clutch unit to the speed conditions to which it is subjected inasmuch as the larger diameter permits a larger number of teeth and thus provides interengageable conditions at a larger number of rotative positions.

While the foregoing described embodiments operate effectively it has been noted in actual experience therewith that under some conditions of operation, particularly when same are operating under heavy load such as to cause extremely rapid changes in relative speed between the parts being shifted, the interengaging pieces sometimes rake and wear excessively and sometimes the interengaging teeth of clutch parts will grip and commence driving before the interengagement thereof is fully completed. When this latter situation occurs so that the interengaging contact between the engaged clutch teeth is less than the full length of the teeth, the compressive forces developed against such teeth become greater than that for which the teeth were designed and failure may occur. It is therefore desirable in these instances to provide means insuring that the clutch teeth will fully engage before load is imposed thereon.

In some cases this can be accomplished merely by increasing the backlash of one set of teeth or the other whereby to provide more space for receiving the interengaging teeth into each other. However, this is of only limited value and does not solve tha problem in the more serious cases.

Figure 6:
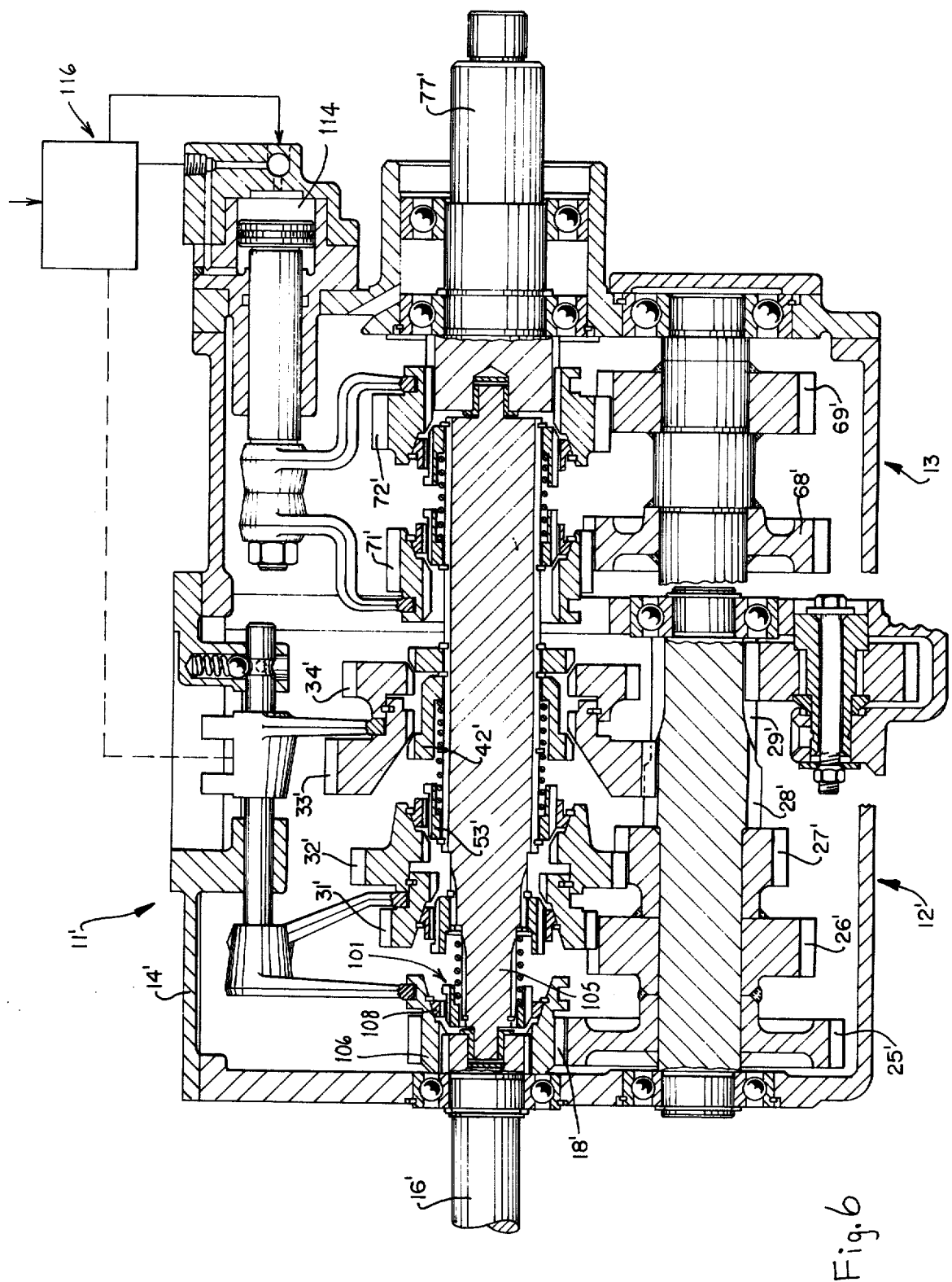
FIG. 6 is a sectional view of a modification, said section being similar to the section of FIG. 2.
Figure 8:
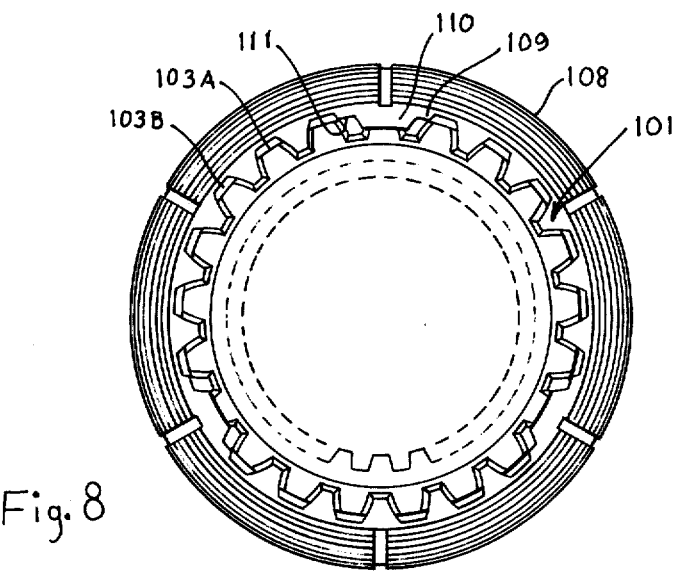
FIG. 8 is an elevation of a slidable clutch component and its associated blocker as viewed from the left in FIG. 7.
Figure 7:
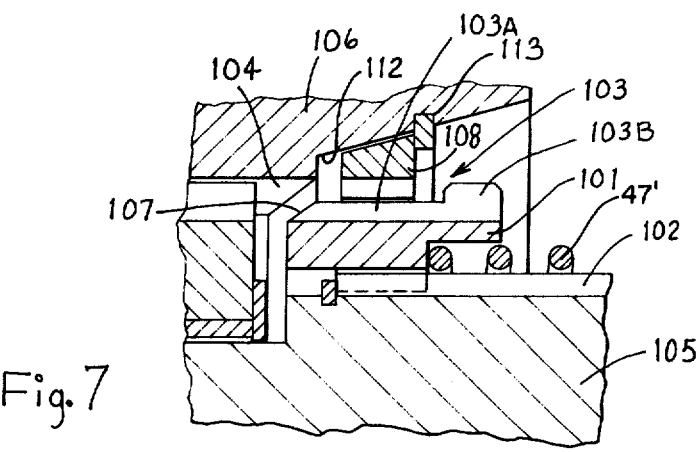
FIG. 7 is a portion of FIG. 2 on an enlarged scale.

With this in mind attention is directed to FIG. 6 which shows in a view generally similar to FIG. 2 a modified system in which blockers have been incorporated into each of the clutch units for operation therewith. Corresponding parts in FIG. 6 have been identified by the same reference numbers used in FIG. 2 but with a prime (') added thereto. In this arrangement, the clutch components of which one appears at 101 are of annular configuration and have internal splining to mate with the external splines 102 (FIG. 7) of the main shaft 105 which latter corresponds to the shaft 23 of the embodiment of FIGS. 1–5. The clutch component 101 has external teeth 103 for meshing with internal teeth 104 on the drive gear 106, said drive gear 106 generally corresponding to the gear 18 of the unit above described. The teeth 103 have a radially shorter drive zone 103A and a radially longer blocking zone 103B for purposes appearing hereinafter. Said teeth arechamfered at their mating ends 107 to mate with similarly chamfered and opposed ends of the teeth 104 for the same purposes as in the embodiment above described. In addition, as shown in FIG. 8, a selected number, here three, of the teeth 103 are removed for permitting passage of the blocking ring as hereinafter further described.

Referring now to the blockers, one thereof is indicated generally at 108 and comprises a ring encircling the clutch component 101 and has an appropriate number, here three, of radially inward projections 110 which when properly positioned will mate with the zone of the removed teeth above mentioned. Same also have sideward projections 109 for effecting the desired blocking. The inner radius 111 of the portion 109 is sufficient to clear the portions 103A of the teeth 103 while when the blocker 108 is in a laterally offset position in a manner common to such blockers the portion 109 will engage the portion 103B of the clutch component 103 and interfere with axial movement thereof.

The external surface of the blocker 108 is sloped to provide a cone clutch contact with a corresponding inner surface 112 of the gear 106. Suitable means, here a snap ring 113, is inserted into said surface 112 to limit movement of the blocker in a direction, here rightwardly, away from clutching contact with said surface 112.

The operation of the blocker 108 is generally similar to that of known blockers. For example, assuming the gear 106 is rotating more rapidly than the clutch member 101, which latter of course rotates at the same speed as the main shaft 105, the blocker 108 will tend to rotate with the gear 106, hence lead the clutch component 101 and impose one of the sideward extensions 109 in a position to interfere with the portions 103B and prevent axial movement of the clutch member 101 in a clutch engaging direction (leftwardly in FIG. 7). However, as the shaft 105 accelerates and a condition of synchronism is approached, the projections 110 of said blockers will become centered with the zones of the removed teeth on the periphery of the clutch component 101 and upon reversal of relative speeds the blockers will no longer block and the clutch component 101 will move into clutching condition in the usual manner.

Where the gear 106 is initially running slower than the shaft 105 the operation will be generally similar to that above described excepting that the blocker 108 will lag behind the clutch component 101 until there occurs a reversal of relative speeds at which blocking will cease and clutching will again be completed in a manner already well known for blocking devices.

The remaining blocking units shown in FIG. 6 are constructed and operate similarly and no further description is therefore needed.

Figure 9:
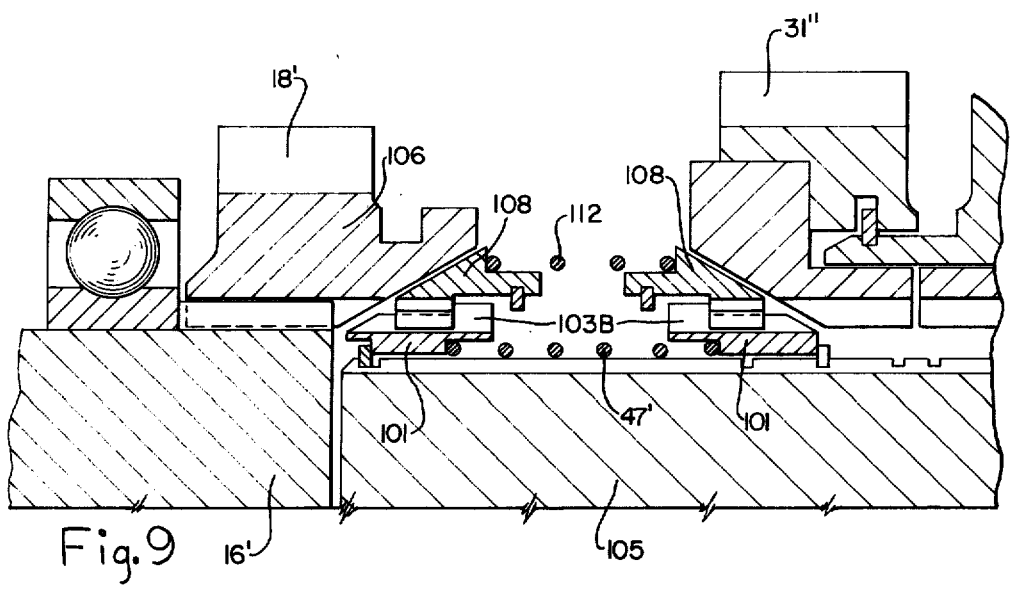
FIG. 9 shows a further modification on a section and scale similar to FIG. 7.

FIG. 9 shows a generally similar form of blocking unit wherein a spring 112 is utilized to initiate engagement of the blockers with the respective gears with which they cooperate. Normally such a spring is not needed but in instances where a more positive action of the blocker is desired, such spring will be helpful.

A further problem sometimes has developed in this system with the use of blockers in that the entire main shaft 105 is, as already described, connected solidly through the range shift gears to the propeller shaft of the vehicle. Therefore, in normal shifting of the step gears (the gears other than the range shift gears), each time such gears are moved into neutral condition the windup in the propeller shaft will be transmitted into the step shifting portion of the transmission, impose oscillations thereon and possibly disturb the operation of the blockers. It will therefore often be desirable to avoid this difficulty by providing that the gears, which in the embodiment of FIGS. 1-5 are shown as range shift gears, be instead splitter gears as shown in FIG. 6 and that the shift mechanism be so controlled that the splitter gears become disengaged prior to the disengagement of any of the step gears. One simple way to accomplish this is merely to provide the auxiliary transmission with a larger pressure fluid energized shift cylinder 114 than is provided for the main transmission. Since the same torque is applied to the gears of both transmissions, this will effect pull-out of the auxiliary transmission before pull-out of the main transmission. Other control means may, of course, also be used. Thus, the main shaft 105 is isolated from the propeller shaft of the vehicle during each step shift and the effect of such windup will not disturb the operation of the blockers. The control of the shifting for both the splitter and step portions of the transmission and the interconnection of such controls are schematically indicated at 116 in FIG. 6 and may be of any conventional and presently known type.

Although particular preferred embodiments of the invention have been disclosed in detail above for illustrative purposes, it will be recognized that variations or modifications of the disclosed apparatus, including the rearrangement of parts, lie within the scope of the present invention.

The embodiment of the invention in which I claim an exclusive property or privilege are defined as follows:

1. In an interengageable jaw clutch system the combination comprising:

first rotatable means and a first jaw clutch portion mounted thereon for axial sliding relationship therewith and positive rotation therewith about an axis;

second rotatable means coaxially related to said first means and a second jaw clutch portion arranged thereon for interengagement with said first jaw clutch portion upon relative axial movement of said jaw clutch portions toward one another;

one of said jaw clutch portions having drive teeth at a radius suitable for engaging with clutch teeth on the other jaw clutch portion, said one clutch portion having also blocking teeth projecting radially beyond and axially offset from said drive teeth;

blocker means coacting between said first and second jaw clutch portions for positively preventing engagement of said jaw clutch portions so long as a substantial difference in relative speed exists therebetween, said blocker means including an annular blocker having blocking portions arranged on and supported by said drive teeth for limited rotation with respect thereto and positioned axially between said blocking teeth and said clutch teeth when said jaw clutch portions are disengaged, some of said blocking teeth being provided with spaces therebetween capable of receiving therein said blocking portions when said blocking portions and said spaces are axially aligned to permit said blocking portions to relatively move axially past said blocking teeth so that said jaw clutch portions can be engaged with one another; and a surface on said blocker frictionally cooperating with a surface on said other jaw clutch portion for circumferentially offsetting said blocker with respect to said one jaw clutch portion whenever and for so long as a substantial difference in relative rotative speeds exist between said respective jaw clutch portions, said blocking portions interfering with said blocking teeth when said blocker is circumferentially offset so as to prevent engagement of said jaw clutch portions.

2. The device of claim 1 wherein the drive teeth of said one jaw clutch portion are on an external surface thereof and the blocking teeth thereof extend radially outwardly beyond the peripheral tips of said drive teeth, wherein said spaces are defined in part by blocking teeth which have been at least partially removed from said one jaw clutch portion, and wherein the blocking portions of said blocker are internal projections substantially in mesh with the removed teeth of said one jaw clutch portion.

3. A system according to claim 1, wherein each said space is formed by at least partially removing one of said blocking teeth, said one jaw clutch portion also having a plurality of secondary spaces respectively aligned with said first-mentioned spaces, each secondary spacing formed by at least partially removing the drive tooth which is aligned with the removed blocking teeth;

each said blocking portion including an enlarged center portion which is normally maintained in said secondary space, said center portion having a width less than the width of said secondary space whereby said blocker is permitted to undergo limited rotation with respect to said one jaw clutch portion;

each said blocking portion further including a pair of end portions projecting outwardly from opposite sides of said center portion and being disposed to overlie the free ends of the adjacent drive teeth disposed on opposite sides of said secondary space when said center portion is lcoated in said secondary space, said end portions being adapted to be axially aligned with and abut against said blocking teeth when said blocking portion is offset from a central position to prevent said jaw clutch portions from being shifted into engagement with one another, said center portion and said end portions being relatively slidable into said first-mentioned space when said center portion is in said central position within said secondary space to permit said jaw clutch portions to be relatively moved into engagement with one another.

4. A system according to claim 1, wherein the drive teeth and clutch teeth as formed on the jaw clutch portions project radially relative to said axis but project in opposite direction, said drive teeth and clutch teeth intermeshing with one another when said jaw clutch portions are engaged with one another, and wherein said blocking portions comprise toothlike members which also project radially relative to said axis, said toothlike members projecting in a direction opposite to said drive teeth.

5. A system according to claim 1, further including spring means coacting between said first jaw clutch portion and said first rotatable means for resiliently urging said first jaw clutch portion in a direction towards said second jaw clutch portion.

6. An interengageable clutch system, comprising:
first jaw clutch means supported for rotation about an axis, said first jaw clutch means including an annular peripheral surface and a set of first clutch teeth projecting radially therefrom;
second jaw clutch means coaxially aligned with said first jaw clutch means and supported for rotation about said axis, said second jaw clutch means including a set of second clutch teeth projecting radially therefrom, said first and second clutch teeth projecting radially in opposite directions and being sized to meshingly engage with one another;
means for effecting relative axial shifting of said first and second jaw clutch means between a first position wherein said first and second clutch teeth are in a disengaged and axially spaced relation and a second position wherein said first and second clutch teeth are meshingly engaged;
blocking means coacting between said first and second jaw clutch means for preventing same from being shifted into said second position so long as a substantial difference exists in the rotational speed between said first and second jaw clutch means, said blocking means including a set of blocking teeth fixedly associated with said first jaw clutch means and projecting radially from the peripheral surface associated therewith, said blocking teeth being axially aligned with said first clutch teeth and projecting radially beyond the free ends of said first clutch teeth so that said blocking teeth have a radial dimension which is greater than the radial dimension of said first clutch teeth, and at least one of said blocking teeth being at least partially removed to define a space;
said blocking means further including a ring-shaped blocker concentric with said first jaw clutch means and supported thereon, and means coacting between said blocker and said first jaw clutch means for permitting limited rotation therebetween, said blocker also being axially slidable relative to said first jaw clutch means and having a blocking portion projecting therefrom adapted for slidable reception within said space when said first and second jaw clutch means are shifted into said second position, said locking portion having a part thereof positioned to interfere with said blocking teeth and prevent said first and second jaw clutch means from being shifted into said second position when said blocker is circumferentially offset with respect to said first jaw clutch means due to a substantial difference existing in the rotative speeds between said first and second jaw clutch means; and
said blocker and said second jaw clutch means having opposed, tapered annular surfaces which frictionally cooperate with one another to reduce the relative rotational speed between said first and second jaw clutch means when they are being relatively shifted toward said second position.

* * * * *